United States Patent [19]

Reid, Jr.

[11] Patent Number: 5,725,891

[45] Date of Patent: Mar. 10, 1998

[54] FAST THERMAL RESPONSE MOLD

[75] Inventor: Walter L. Reid, Jr., Mattapoisett, Mass.

[73] Assignee: Acushnet Company, Fairhaven, Mass.

[21] Appl. No.: 802,036

[22] Filed: Feb. 18, 1997

Related U.S. Application Data

[63] Continuation of Ser. No. 455,442, May 31, 1995, abandoned.

[51] Int. Cl.⁶ .................................................. B29C 35/04
[52] U.S. Cl. .......................... 425/407; 249/79; 249/81; 249/119; 425/408; 425/547; 425/552
[58] Field of Search .................................. 425/407, 328, 425/DIG. 9, 292, 408, 547, 552; 249/79, 119, 81

[56] References Cited

U.S. PATENT DOCUMENTS

| | | | |
|---|---|---|---|
| 2,104,673 | 9/1938 | Rieser et al. | 425/DIG. 9 |
| 3,871,811 | 3/1975 | Barry et al. | 425/407 |
| 3,876,358 | 4/1975 | Farrell | 425/243 |
| 4,395,222 | 7/1983 | Gaiser et al. | 425/548 |
| 4,508,309 | 4/1985 | Brown. | |
| 4,558,499 | 12/1985 | Brown. | |
| 4,786,455 | 11/1988 | Krishnakumar et al. | 264/237 |

FOREIGN PATENT DOCUMENTS

| | | | |
|---|---|---|---|
| 0 095 625 | 12/1983 | European Pat. Off. | |
| 3149962 | 6/1983 | Germany | 425/292 |
| 62 179912 | 1/1988 | Japan. | |

OTHER PUBLICATIONS

"Injection Molding Handbook" by Rosato Copyright 1986 pp. 360-361, Fig 13-7, PTOSTIC.

Primary Examiner—Jay H. Woo
Assistant Examiner—Iurie A. Schwartz
Attorney, Agent, or Firm—Pennie & Edmonds LLP

[57] ABSTRACT

The invention is an improvement to mold frames having replaceable half-molds for forming golf balls. The invention is directed to dividing the flow path through the mold for the thermal medium into a plurality (2 to the number of cavity rows) of parallel flow paths, i.e., water entering the mold flows through only one row of half-molds.

8 Claims, 6 Drawing Sheets

FAST THERMAL RESPONSE MOLD

This is a continuation of application Ser. No. 08/455,442, filed May 31, 1995, now abandoned.

TECHNICAL FIELD

This invention relates to a mold and, more particularly, to a mold having a mold plate with a plurality of cavities for receiving replaceable half-molds. Still further, the invention relates to the flow paths for the thermal medium for such molds and methods of operating such molds.

BACKGROUND OF THE INVENTION

Figure 1:
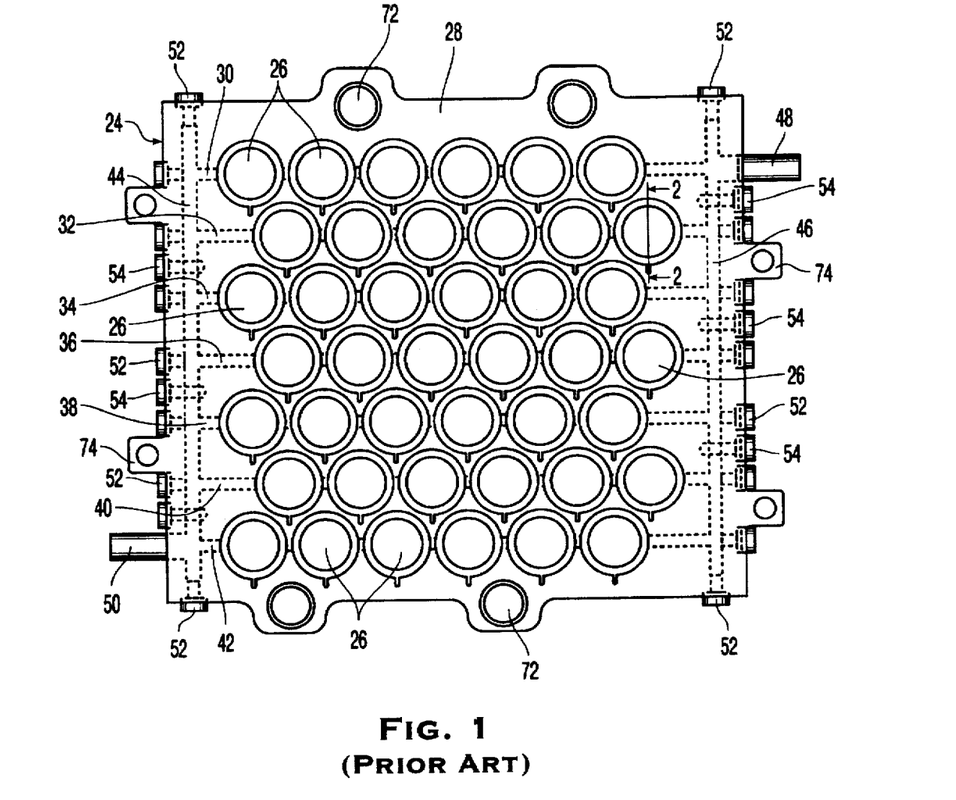
FIG. 1 is a top view of a prior art mold frame.

The present invention relates to improvement to molds such as that disclosed in U.S. Pat. Nos. 4,508,309 and 4,558,499, both of which issued to Robert A. Brown, are assigned to Acushnet Company and are incorporated herein by reference. These patents are directed to the mold frame disclosed in FIGS. 1 and 2 herein. FIG. 1 discloses a mold frame 24. A plurality of cavities 26 in the mold frame 24 accommodate golf ball half-molds (not shown) and are disposed in a closely packed arrangement.

The prior art mold frame 24 includes a plurality of bores 30, 32, 34, 36, 38, 40 and 42 which penetrate through respective rows of cavities 26. An inlet 48 is provided for receiving a thermal medium such as steam or cooling fluid. The inlet 48 is disposed at one end of bore 30 and an outlet 50 is disposed at the end of bore 42, the opposite side of the mold frame 24 from inlet 48. The mold frame 24 also includes cross bores 44 and 46 on opposite ends of the cavity rows for providing fluid communication between the bores 30-42. The ends of each bore and cross-bore, except for the inlet 48 and the outlet 50, are plugged by a plurality of short plugs 52 threadingly received therein. Longer plugs 54 are disposed alternately between adjacent bores on opposite sides of the plate and serve to selectively block the cross-bores to create a serpentine series flow of the thermal medium through the adjacent cavities. Thus, the thermal medium enters through the inlet 48 and flows through each bore 30-42 before exiting through the outlet 50.

Figure 2:
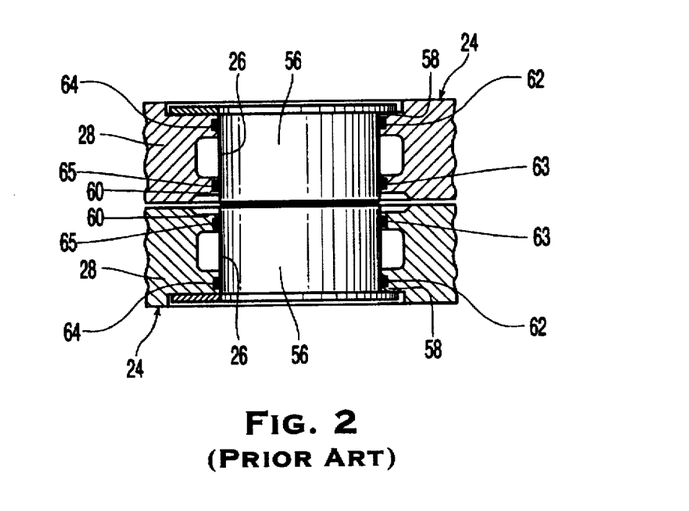
FIG. 2 is a partial cross-sectional view through lines 2—2 of FIG. 1 of the prior art mold frame.

Referring to FIG. 2, the mold frame 24 of the prior art is comprised of mold plates 28 that are held in opposing abutment during the molding operation. Half-molds 56 are disposed in the cavities 26 to be held in opposed abutment to form golf balls from ball assemblies. Annular lips 58 and 60 jut inwardly from the plate members 28 to overhang a larger diameter cavity portion therebetween which is interconnected to the adjacent cavity through the intersecting bores 30-42. Annular lips 58 and 60 include seals such as O rings 64 and 65 to seal around the half-molds 56.

Thus, the thermal medium that enters the mold frame 24 at inlet 48 will flow in a serpentine flow pattern and will flow around each of the half-molds 56 to provide the heating or cooling thereof. As the thermal medium flows past each half-mold 56 there is a transfer of thermal energy. For example, as cooling fluid flows past a half-mold 56, heat from the half-mold 56 will be transferred to the cooling fluid under the principles of forced convection and conduction. Thus, the half-mold 56 will loose heat and the cooling fluid will gain heat. Therefore, the cooling fluid will be at a higher temperature as it flows around each later half-mold 56 in the flow path and the efficiency of the cooling fluid to cool the later half-mold 56 is reduced.

Thus, when heating or cooling the prior art mold, there existed a substantial temperature differential between the first and last half-mold in the serpentine flow path. One problem that exists with this type of mold is that to properly melt the golf ball cover material, the mold 24 has to be preheated. Preheating the mold to the melting temperature helps insure that the molding of the golf balls is uniform. However, preheating the mold adds to the molding cycle time and makes loading the half-molds difficult. Also, the mold operator must load the ball assemblies into the half-molds. Thus, from an operator's standpoint, it is much more advantageous to load the half-molds when the mold is cold rather than hot.

In order to properly mold the golf balls in the prior art mold, the process comprised the steps of preheating the mold, loading half-molds, melting the golf ball cover material with hot thermal medium, cooling the golf balls with cold thermal medium and then unloading the mold. Thus, the preheating step provided an inefficiency in the molding process in that the mold had to be opened twice to unload and load the half-molds.

SUMMARY OF THE INVENTION

The invention is an improvement to the mold frame described above. More particularly, the invention is a mold configured to have an improved flow path for the thermal medium. The invention is directed to dividing the flow path through the mold for the thermal medium into a plurality (2 to the number of cavity rows) of parallel flow paths, i.e., water entering the mold flows through only one row of half-molds. In this manner, the maximum number of half-molds in any one flow path is reduced. Thus, the thermal medium will flow around a reduced number of half-molds such that the thermal response delay between the first and last half-mold is reduced and the time/temperature response of all half-molds in the mold is much more uniform.

In one embodiment of the invention, the mold frame includes two inlets. The thermal medium enters the mold through the inlets and divides to flow through the rows of half-molds. The total thermal medium that enters each inlet will flow through approximately ½ of the rows of half-molds. However, any portion of the thermal medium will only flow around half-molds in one row which is substantially less than with the serpentine flow path. Thus, the temperature change and the pressure drop of the thermal medium from when it flows around the first half-mold to when it flows around the last half-mold in its flow path is greatly reduced over the prior art.

In another embodiment of the invention, the flow path is divided into parallel flow paths equal to the number of cavity rows. In other words, there are the same number of inlets as cavity rows. Again, the flow enters the mold plates, flows across only one row of mold cavities and half-molds, and exits the mold. In this embodiment, there is no pressure drop in the mold plates for flow diversion. Thus, the temperature change and the pressure drop of the thermal medium from when it flows around the first half-mold to when it flows around the last half-mold is greatly reduced over the prior art.

The present invention is also directed to an improved method of operating the mold. The method incorporates flowing thermal medium in parallel paths through the half-mold rows. More particularly, the method includes substantially increasing the thermal medium volume flow rate through the entire mold, but maintaining the same flow velocity through each half-mold row. Since the flow path length and complexity is reduced through the mold, the pressure drop through the mold is substantially decreased. Thus, the amount of thermal medium flowing through the mold is increased, but the energy required to produce the flow is substantially the same. Thereby, the mold efficiency is greatly increased and the power required to operate the mold remains substantially constant.

Furthermore, the method of operating the mold includes unloading and loading the half-molds from the mold while the mold is in the cold state. The method is comprised of the steps of cooling the mold by flowing cold thermal medium such as cold water therethrough, unloading and loading under cool conditions, purging the cold thermal medium with compressed air, flowing hot thermal medium such as steam through the half-mold rows to mold the golf balls and flowing cold thermal medium through the half-mold rows to cool the golf balls.

DETAILED DESCRIPTION OF THE PREFERRED EMBODIMENTS

Figure 3:
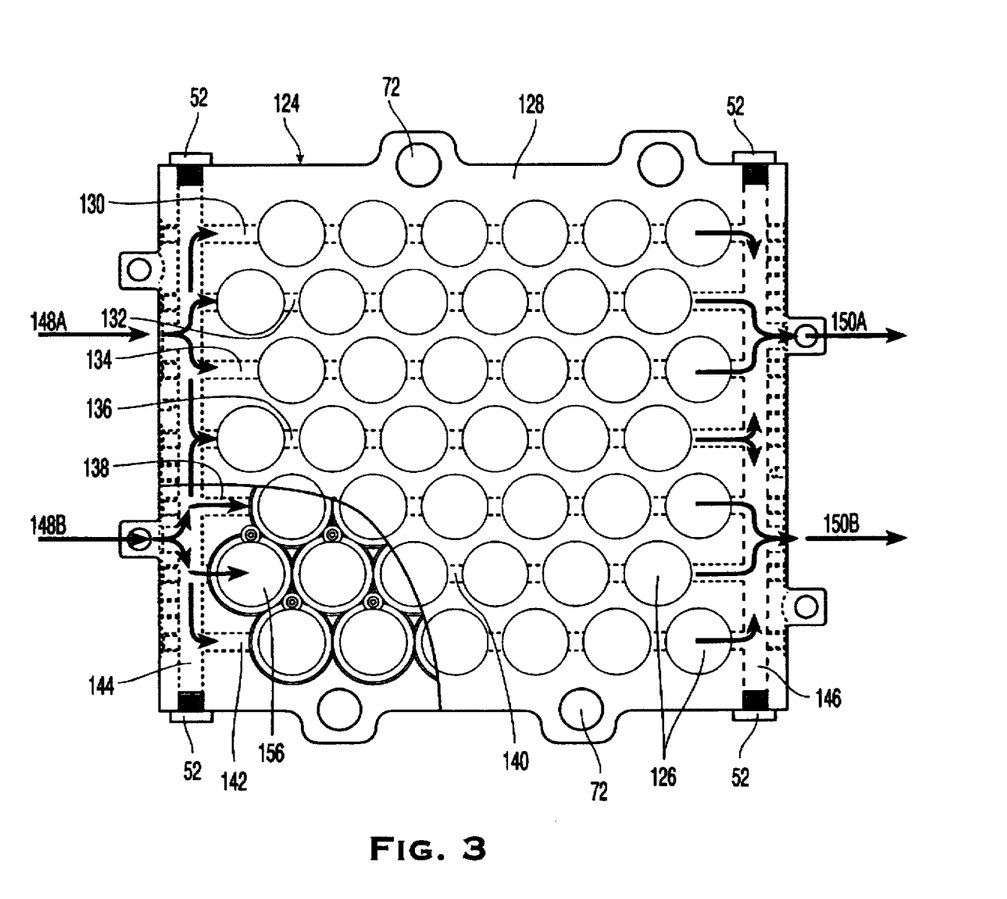
FIG. 3 is a top view of a first embodiment of a mold frame according to the present invention.

FIG. 3 discloses a first embodiment of a mold frame 124 according to the present invention. The mold frame 124 includes a plurality of cavities 126 for accommodating golf ball half-molds 156, that are disposed in a closely packed arrangement in a mold plate member 128.

A plurality of bores 130, 132, 134, 136, 138, 140 and 142 penetrate respectively through cavities 126 and thereby define rows of cavities. These bores 130–142 provide channels for fluid communication between each adjacent cavity in the rows. Thus, the thermal medium such as steam, hot liquid or cooling liquid, such as water or ethylene glycol, can be introduced to the mold for heating and cooling each of the half-molds as required. The mold frame 124 includes a plurality of inlets 148. In this embodiment, there are two inlets 148A and 148B. The mold frame is configured such that the thermal medium will flow into a cross bore 144. The cross bore is dimensioned larger than the cavity row bores 130–142 such that it can incorporate a significantly greater amount of flow to be divided into flow through the cavity row bores. The thermal medium entering through inlet 148A will flow through bores 130, 132, 134 and 136.. Fluid entering through inlet 148B will flow through bores 142, 140, 138 and 136. The mold is further configured such that the thermal medium can flow through an end cross bore 146 and exit through the outlets 150A and 150B. Again, the end cross bore 146 is dimensioned larger than the cavity row bores 130–142 so that substantially more flow can traverse therethrough. Preferably, the cross bores 144 and 146 are dimensioned to have about twice the cross-sectional area as the cavity row bores 130–142. For example, the cross bores are preferably ¾" diameter for cavity row bores of ½" diameter.

Figure 7:
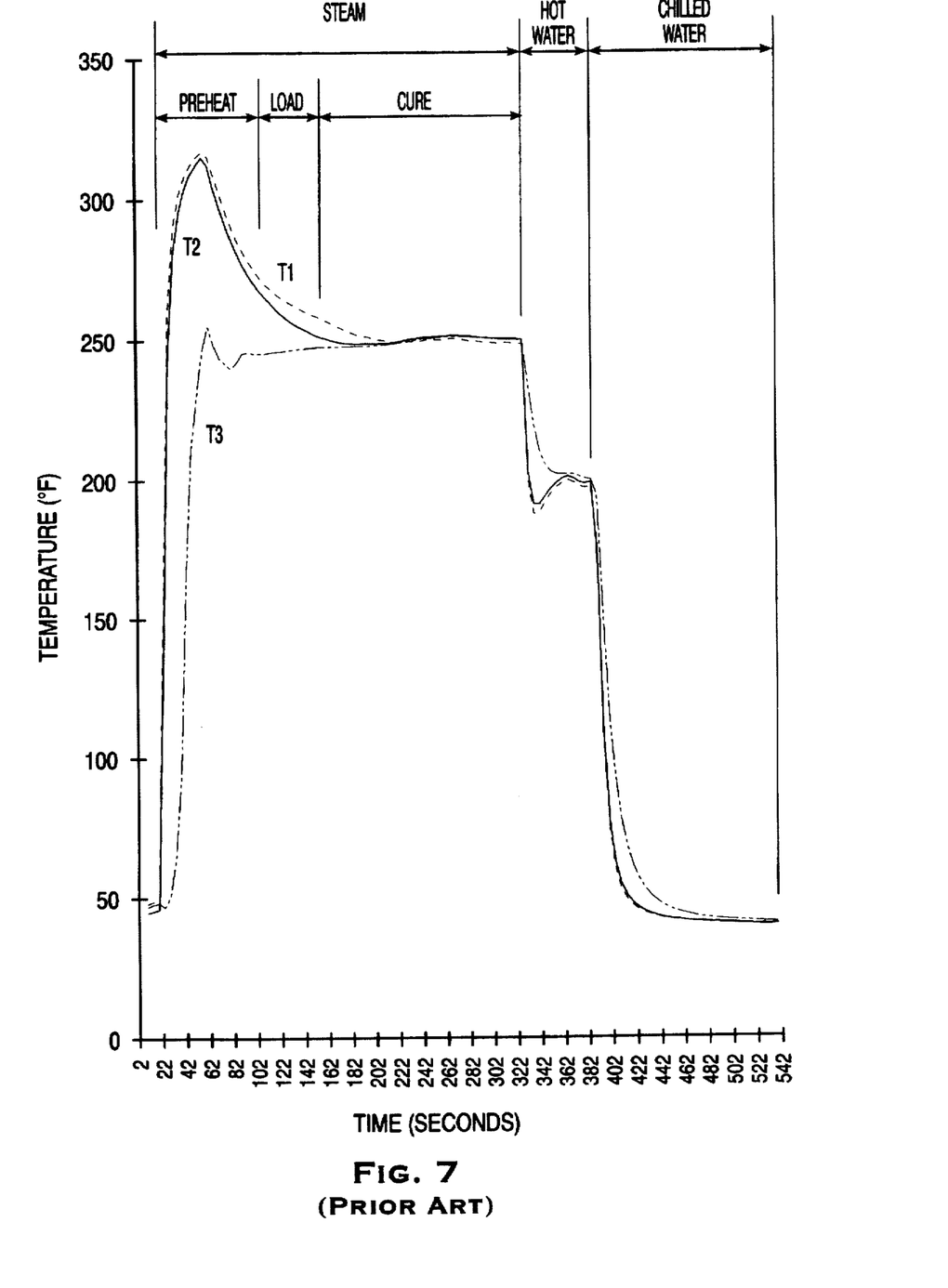
FIG. 7 is a graphical depiction of prior art method of molding golf balls from ball assemblies.
Figure 8:
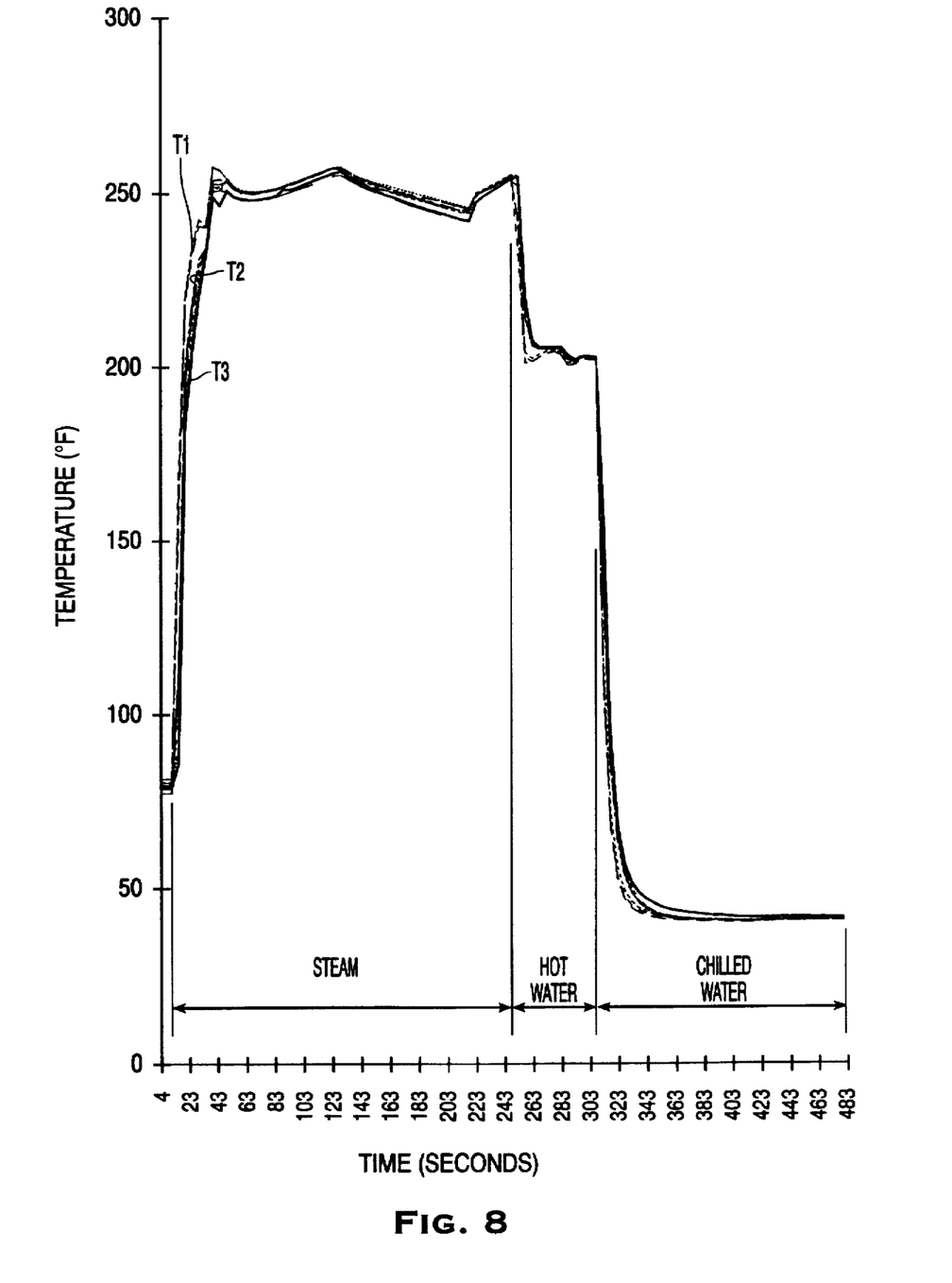
FIG. 8 is a graphical depiction of the method of molding golf balls from ball assemblies using the first embodiment mold shown in FIG. 3.

Referring to FIGS. 7 and 8, the difference in temperature of the last cavity in the flow path to the first cavity in the flow path is substantially reduced for the duration of a molding cycle for the present invention over the prior art. For example, when the golf ball mold cavities are heated to approximately 245° Fahrenheit and then cooled with hot water at approximately 200° Fahrenheit, the difference in temperature between the first mold cavity and the last mold cavity of each of the flow paths is greatly decreased. As shown in FIG. 7, there is a substantial lag in the change of temperature for T3, which is the temperature of the last half-mold in the serpentine flow path. Comparatively, FIG. 8 includes the temperature for three of the first half-molds and all of the last half-molds. These temperatures are substantially more uniform in the cycle than those in FIG. 7. Moreover, the time it takes for all of the half-molds to reach a temperature of less than 50° by flowing cold water at approximately 40° is just greater than ½ the time it takes for the serpentine flow path of the prior art. Thus, the temperature cycle for the half-molds in the present invention is more uniform and quicker than in the serpentine flow mold.

Referring back to FIG. 3, there are seven rows of cavities disclosed with six cavities in each row, i.e. a 42 cavity mold. One advantage of the present invention is that the number of rows and/or the number of cavities per row can be increased since the flow path of the thermal medium is decreased. Thus, mold frames having nine or more rows of cavities and seven cavities or more per row could be used to greatly increase the productivity of the golf ball mold.

Figure 4:
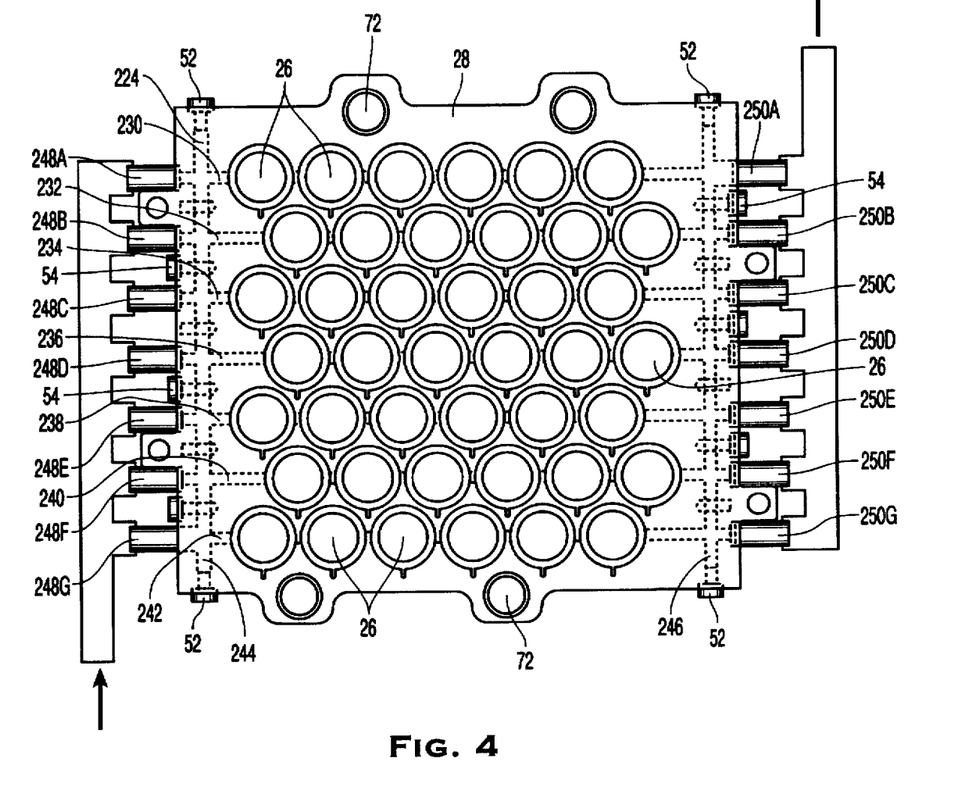
FIG. 4 is a top view of a second embodiment of a mold frame according to the present invention.

Referring to FIG. 4, a second embodiment of a mold frame 224 according to the invention is shown. Again, the mold frame 224 includes a plurality of cavities 26 for accommodating golf ball half-molds (not shown). These mold cavities are disposed in a closely packed arrangement in a mold frame plate member 28. The mold frame 224 further includes a plurality of bores 230, 232, 234, 236, 238, 240 and 242 which penetrate respectively through cavities 26 and, thereby, define rows of cavities. These bores 230–242 form channels for providing for the fluid communication between each adjacent cavities 26 in the row. This allows for the thermal medium, such as steam or cooling liquid, to flow around the half-molds (not shown).

Again, in this embodiment, the flow paths are in a parallel arrangement, such that any portion of the thermal medium only flows through one row of cavities. Each of the rows of cavities and bores 230 through 242 has its own inlet 248A through 248G and its own outlet 250A through 250G on respective ends of the bores.

Figure 5:
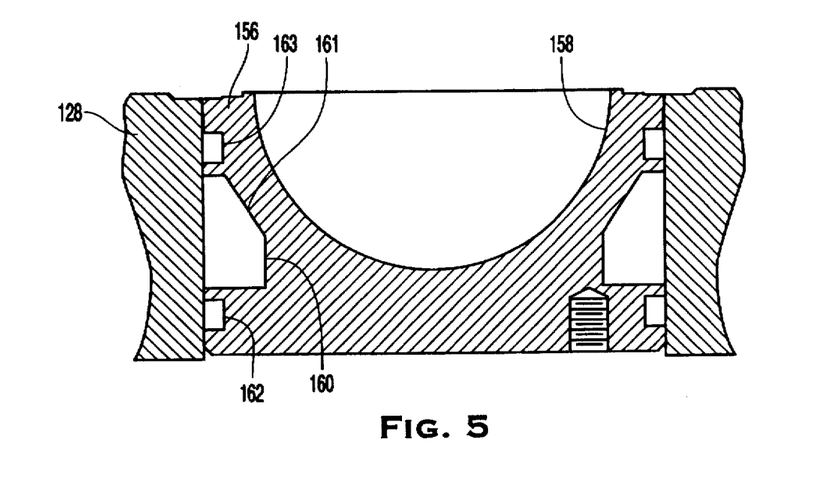
FIG. 5 is a cross-sectional view of an improved half-mold cup that can be used with the first or second embodiment.

Referring to FIG. 5, the present invention can also be practiced with an improved half-mold 156. The half-mold 156 includes an inner cavity 158 for receiving ball assemblies. The half-mold includes two circumferential seal grooves 162 and 163 for receiving sealing means such as O-rings. Finally, the half-mold 156 includes a circumferential flow channel 160 which is machined from the outer surface of the half-mold 156. By machining the flow channel 160 out of the half-mold 156 rather than the mold plate, the mold frame 128 becomes more durable and the flow path around the half-mold is more uniformly conforming to the ball assemblies. More particularly, the channel surface 161 can more closely follow the contour of the inner cavity 158 such that the ball assembly therein is more uniformly heated or cooled than when fluid flows around the perpendicular walls disclosed in the prior art.

In any embodiment of the present invention, the mold can be operated by an improved method. The method incorporates the step of flowing thermal medium in parallel paths through the half-mold rows which are defined by the cavity flow bores to reduce the thermal response differential between first and last molds. Preferably, the method includes substantially increasing the thermal medium volume flow rate through the entire mold and maintaining the flow velocity. This can be accomplished because there is a substantial drop in pressure loss through the system. For example, in the prior art mold, thermal medium could be pumped through the mold at approximately five to six gallons per minute. Comparatively, the present mold can be operated by flowing approximately four to five gallons per minute through each half-mold row. In the prior art, the flow had to be at a much higher pressure to serpentine through the mold than in the present invention. One advantage to flowing the fluid in the less restrictive flow path of the present invention is that the pressure drop through the mold is substantially reduced. Thus, in the present invention, the amount of thermal medium flowing through the mold can be increased over the prior art, but the energy required to produce the flow is substantially the same the prior art. Therefore, in the present invention, the mold efficiency is greatly increased and the power required to operate the mold remains substantially constant.

Another advantage over the prior art is that the mold of the present invention can be operated in an advantageous manner because of the decrease in thermal response time and variation. In the prior art mold, the mold had to be preheated before loading the golf balls so that the golf balls would be uniformly cured. In the present invention, the method of operating the mold can include unloading and loading the half-molds from the mold while the mold is in the cold state.

Figure 6:
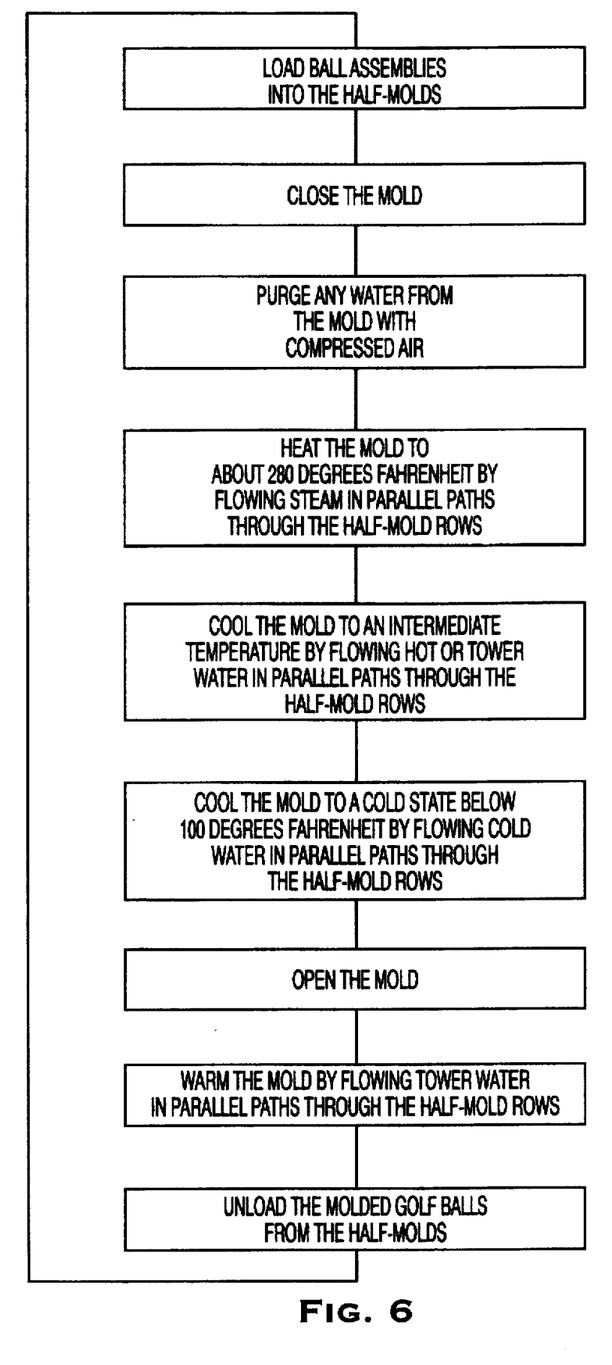
FIG. 6 is a schematic of the method of molding golf balls from ball assemblies.

Referring to FIG. 6, the preferred method is comprised of the steps, loading the half-molds with ball assemblies when the mold is cold; i.e., the mold is less than 100 degrees Fahrenheit, closing the mold; purging any cold or tower water from the mold with compressed air; molding the golf balls by flowing hot thermal medium, such as steam at a temperature of about 350 degrees Fahrenheit to heat the mold to between 275 and 295 degrees Fahrenheit such that the cover material of the ball assemblies melt, cooling the mold to an intermediate temperature by flowing hot water at a temperature between 180 and 210 degrees Fahrenheit or tower water at approximately 85 degrees Fahrenheit through the half-mold rows; and cooling the half-molds to a cold state by flowing cold thermal medium such as cold water at a temperature between 35 and 45 degrees Fahrenheit, through the half-mold rows to cool the cured golf balls; opening the mold; flowing tower water at approximately 80–85 degrees Fahrenheit to prevent condensation when the mold is open and unloading the molded golf balls from the cold mold. In the most preferred method, hot thermal medium such as steam at about 350 degrees Fahrenheit is used to heat the molds to approximately 280 degrees Fahrenheit to mold the golf balls and the cold thermal medium is water at about 40 degrees Fahrenheit. A further step of flowing moderate thermal medium such as tower water at approximately 85 degrees Fahrenheit can be used to reduce the drastic effect of the cooling cycle. Also, the operation can include flowing tower water through the mold when the mold is open to prevent condensation in the half-molds and compressed air can be used to purge the water from the mold before steam is introduced into the mold.

While it is apparent that the illustrative embodiments of the invention herein fulfills the objectives of the invention, it will be understood that the appended claims are intended to cover all such modifications and embodiments which come within the spirit and scope of the present invention.

What is claimed is:

1. A mold frame for receiving a plurality of half-molds comprising:

a frame plate member having a plurality of cavities therein, said cavities being configured for receiving replaceable half-molds, a plurality of half molds, each of said half-molds, when received in a respective one of said cavities, defines a space between itself and the walls of the respective cavity;

a plurality of cavity bores having first and second ends for providing fluid communication between the spaces surrounding the half-molds and defining rows of half-molds;

a cross bore interconnecting the first ends of the cavity bores;

two inlets connected to the cross bore respectively between the first ends of adjacent cavity bores to introduce thermal medium into the cross bore and divert the thermal medium in opposite directions in the cross bore;

wherein the cross bore directs the thermal medium to the first end of each of the cavity bores to provide parallel flow paths for fluid communication between the spaces surrounding said half-molds in said cavities, such that fluid directly contacts each of said half-molds and only flows through one row of half-molds and the mold frame has a substantially uniform temperature distribution.

2. A mold frame comprising in combination:

a mold plate having a plurality of cavities;

a plurality of respective half-molds received in each of the cavities, each of said half-molds being replaceable and having a circumferential flow channel to form a space between itself and a wall of the respective cavity; and flow means in said mold plate for providing a plurality of parallel flow paths for fluid and fluid communication between said spaces surrounding said half-molds, and for providing direct physical contact of fluid with a least a portion of each of said half-molds;

said flow means comprising:

a plurality of parallel cavity bores having first and second ends, each cavity bore interconnecting a row of spaces and providing fluid communication between the spaces;

a cross bore for interconnecting the first end of the cavity bores; and two inlets connected to the cross bore respectively between adjacent first ends of the cavity bores for introducing thermal medium into the cross bore and diverting the thermal medium in opposite directions in the cross bore such that thermal medium flows through the cross bore and into the first end of each of the cavity bores and the mold frame has a substantially uniform temperature distribution.

3. A mold frame for molding golf balls comprising in combination:

a mold plate having a plurality of cavities therein arranged in a plurality of closely packed rows;

a plurality of half-molds disposed respectively in said cavities, said half-mold being adapted for compression molding of golf balls in said half-mold and being replaceable; and annular sealing means at upper and lower portions of each of said cavities, said annular sealing means in each of said cavities cooperating with said half-molds disposed therein to form a sealed annular cavity portion between said upper and lower portions;

a plurality of cavity bores having first and second ends in said mold frame for interconnecting adjacent annular cavity portions in each of said plurality of rows and a cross bore for interconnecting the first ends of the cavity bores; and two inlets arranged for fluid introduction into said cross bore, each inlet disposed between the first ends of adjacent cavity bores whereby the fluid flows into the cross bore, is divided into opposite directions along the cross bore and flows into the first end of the cavity bores such that fluid flow through said cavity bores and said annular cavity portions is parallel and the mold frame has a substantially uniform temperature distribution.

4. The mold frame of claim 3 wherein said mold frame has an inlet for each of said cavity bores.

5. The mold frame of claim 1, 2 or 3 wherein the cross bore has a cross-sectional area that is approximately twice the cross-sectional area of the cavity bores.

6. The mold frame of claim 5 further comprising an end cross bore interconnecting the second ends of the cavity bores and a plurality of outlets connected to the end cross bore.

7. The mold frame of claim 6 wherein the mold frame has 2 outlets connected to the end cross bore in between adjacent rows of cavities.

8. The mold frame of claim 1 wherein the inlets are located between the end rows of the mold and the middle of the mold.

* * * * *